(No Model.)

G. F. LEIGER.
PNEUMATIC SHEET SEPARATING AND FEEDING MACHINE.

No. 557,279. Patented Mar. 31, 1896.

7 Sheets—Sheet 1.

(No Model.) 7 Sheets—Sheet 2.
G. F. LEIGER.
PNEUMATIC SHEET SEPARATING AND FEEDING MACHINE.
No. 557,279. Patented Mar. 31, 1896.

Witnesses
Inventor
George F. Leiger
by Bond, Adams, Pickard & Jackson
Att'ys (No Model.) 7 Sheets—Sheet 4.
G. F. LEIGER.
PNEUMATIC SHEET SEPARATING AND FEEDING MACHINE.

No. 557,279. Patented Mar. 31, 1896.

Witnesses
Wm. F. Huning
Wm. W. Rheem

Inventor
George F. Leiger
by Bond, Adams, Pickard & Jackson Attys.

ANDREW B.GRAHAM, PHOTO-LITHO, WASHINGTON, D.C.

(No Model.) 7 Sheets—Sheet 5.

G. F. LEIGER.
PNEUMATIC SHEET SEPARATING AND FEEDING MACHINE.

No. 557,279. Patented Mar. 31, 1896.

Witnesses
Inventor
George F. Leiger
by Bond, Adams, Pickard & Jackson
Attys

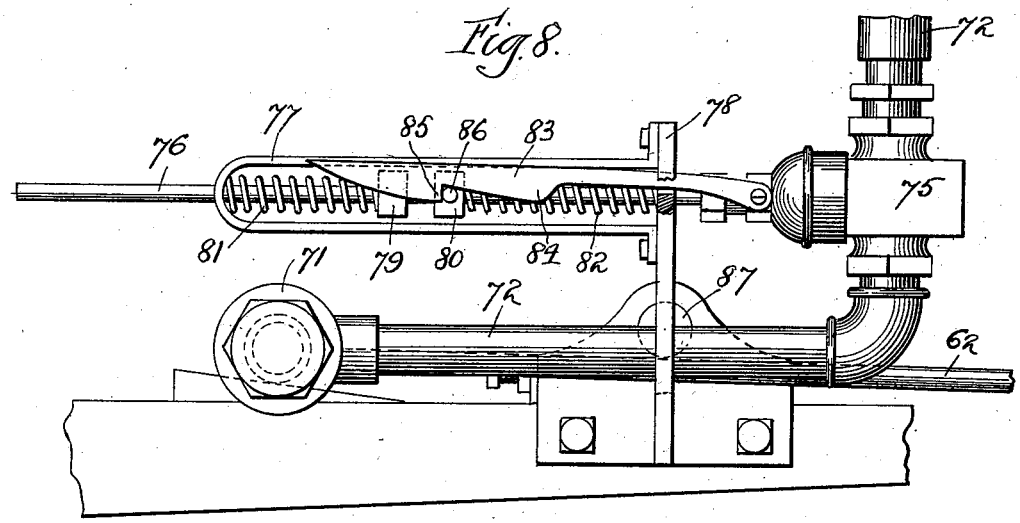

(No Model.) 7 Sheets—Sheet 7.
G. F. LEIGER.
PNEUMATIC SHEET SEPARATING AND FEEDING MACHINE.
No. 557,279. Patented Mar. 31, 1896.
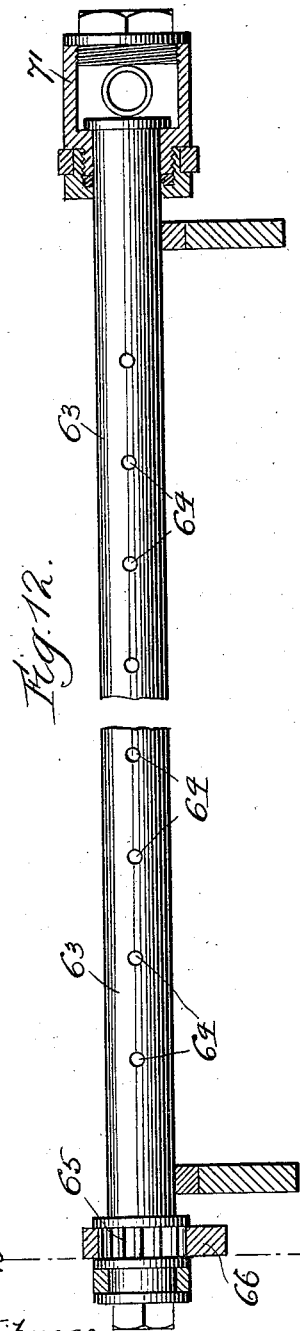
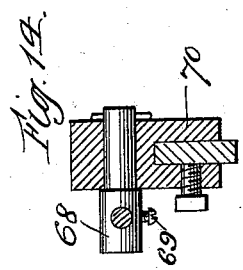
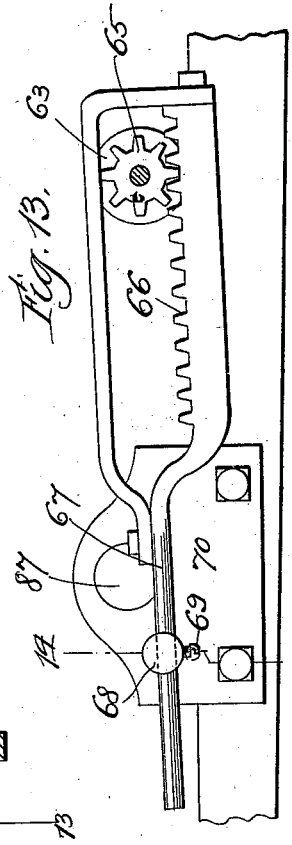
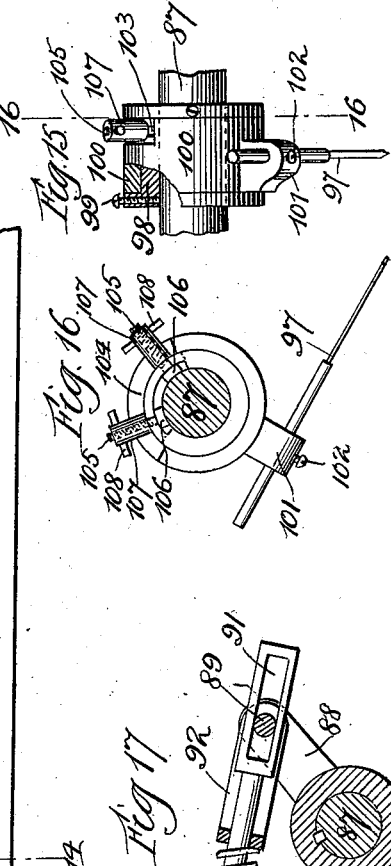
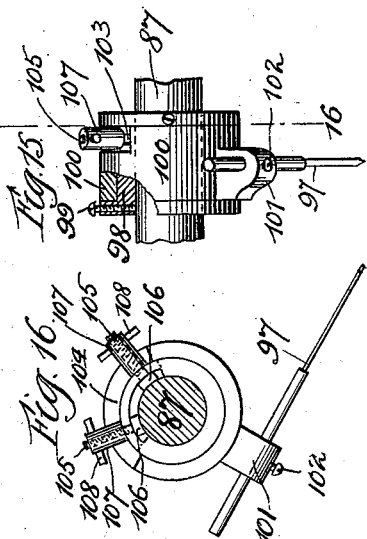
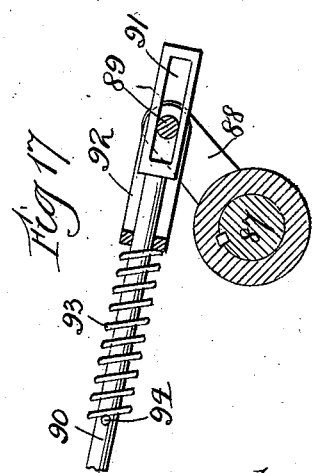
Witnesses
Wm. F. Hanning
Shmr M. Rheem
Inventor
George F. Leiger
by Bond, Adams, Pickard & Jackson
Attys.

UNITED STATES PATENT OFFICE.

GEORGE F. LEIGER, OF CHICAGO, ILLINOIS, ASSIGNOR, BY MESNE ASSIGNMENTS, TO HIMSELF AND LEWIS BENEDICT, OF SAME PLACE.

PNEUMATIC SHEET SEPARATING AND FEEDING MACHINE.

SPECIFICATION forming part of Letters Patent No. 557,279, dated March 31, 1896.

Application filed November 26, 1894. Serial No. 529,982. (No model.)

*To all whom it may concern:*

Be it known that I, GEORGE F. LEIGER, a citizen of the United States, residing in Chicago, in the county of Cook and State of Illinois, have invented certain new and useful Improvements in Pneumatic Machines for Feeding Sheets of Paper to Printing-Presses and Similar Machines, of which the following is a specification, reference being had to the accompanying drawings, in which—

Figure 1:
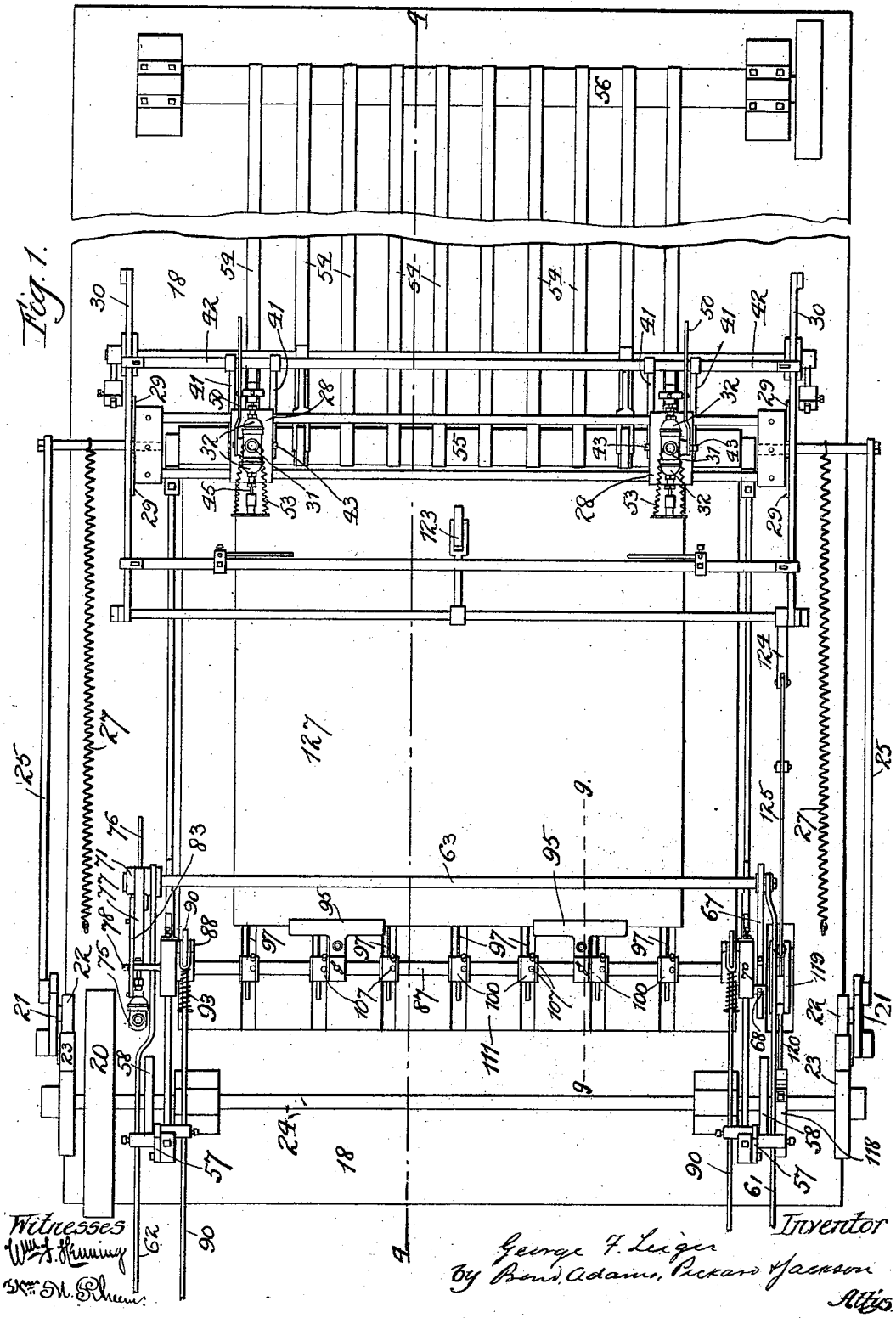
Figure 2:
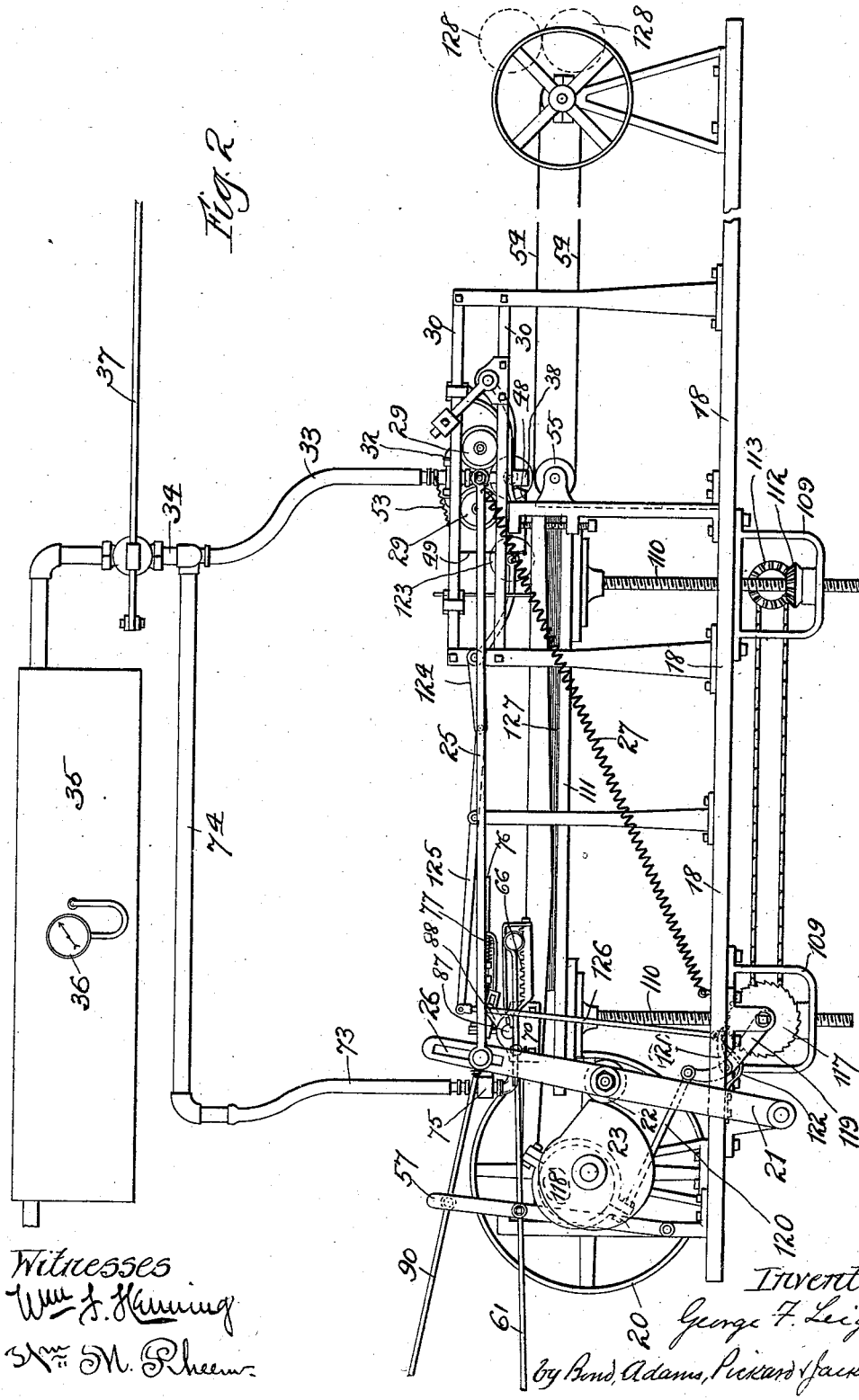
Figure 3:
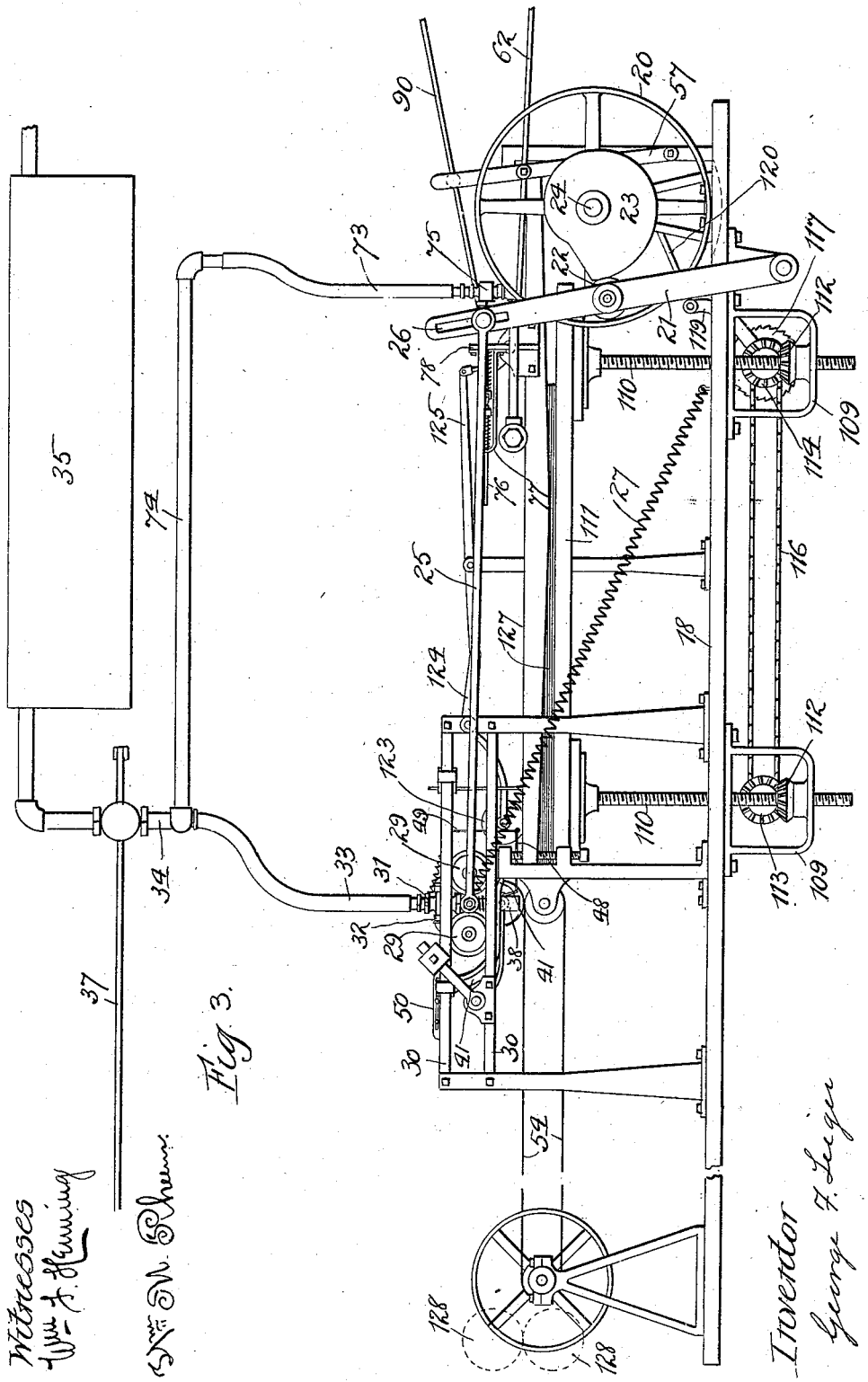
Figure 4:
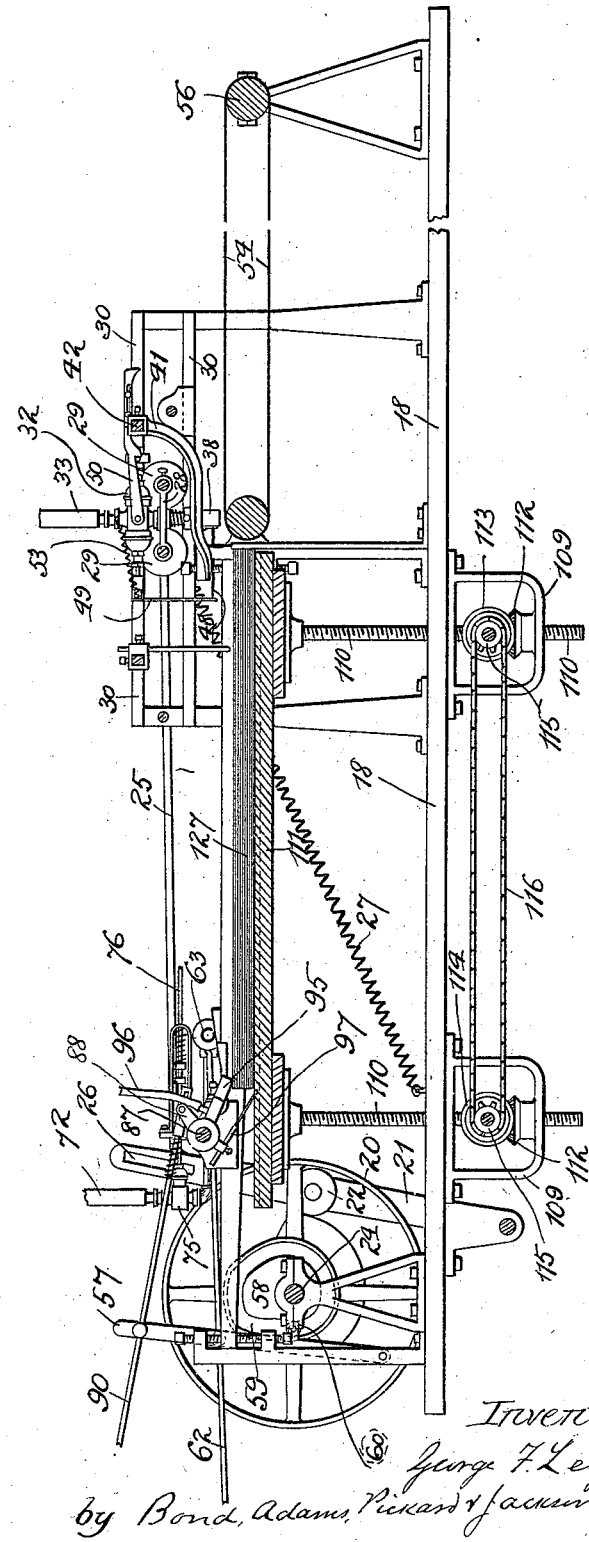
Figure 5:
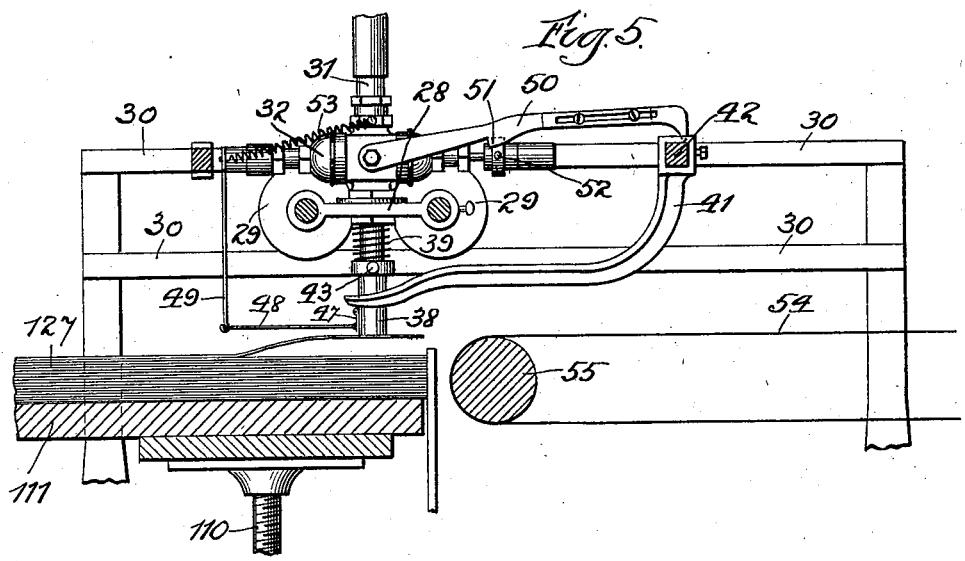
Figure 6:
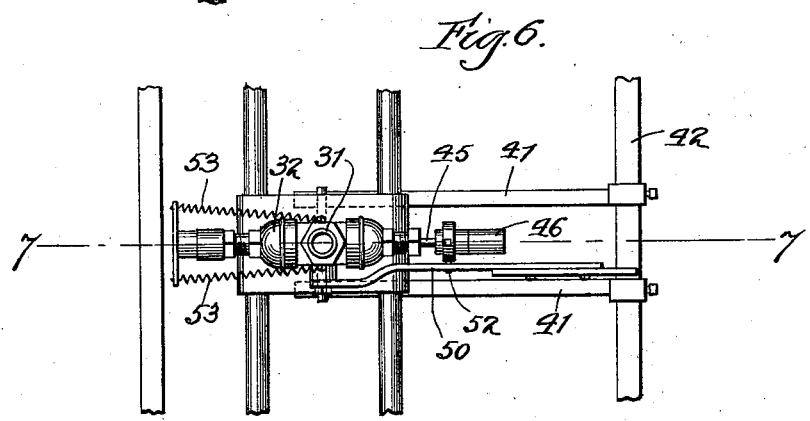
Figure 7:
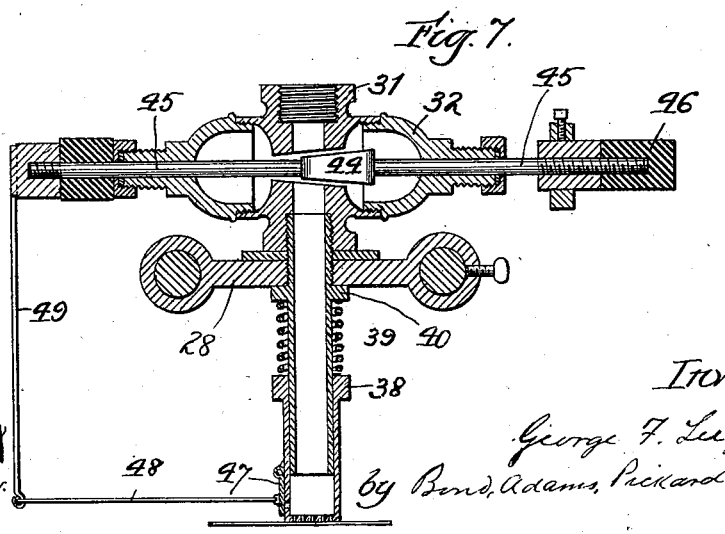

Figure 1 is a top or plan view. Fig. 2 is a side elevation showing one side of the machine. Fig. 3 is a side elevation showing the other side of the machine. Fig. 4 is a longitudinal vertical section upon line 4 4 of Fig. 1. Fig. 5 is an enlarged detail, being a view of the pneumatic picker immediately after the forward edge of the sheet is raised. Fig. 6 is an enlarged detail, being a top or plan view of the pneumatic picker. Fig. 7 is an enlarged detail, being a vertical longitudinal section upon line 7 7 of Fig. 6. Fig. 8 is an enlarged detail, being a view of the valve-moving mechanism for the pneumatic sheet-lifting tube. Fig. 9 is an enlarged detail, being a longitudinal vertical section through the sheet holding and lifting devices upon line 9 9 of Fig. 1, showing the pneumatic roller in its extreme backward position and the sheets lifted against it. Fig. 10 is an enlarged detail, being a section upon the same line as Fig. 9, but showing the pneumatic roller moved backward rolling up and lifting the rear end of the sheet, with the sheet-holding devices holding the sheets down below the lifted one. Fig. 11 is an enlarged detail, being a front view of the sheet-holding device shown in Figs. 9 and 10. Fig. 12 is an enlarged detail, being a view of the pneumatic tube for lifting the rear ends of the sheets, broken away in the center. Fig. 13 is an enlarged detail, being a view of the mechanism by which the pneumatic tube is rotated in its forward and backward movements. Fig. 14 is an enlarged detail, being a cross-section upon line 14 14 of Fig. 13. Fig. 15 is an enlarged detail, being a view of the device by which the mechanism for holding and lifting the rear ends of the sheets is mounted upon the shaft. Fig. 16 is an enlarged detail, being a section made by a plane passing through line 16 16 of Fig. 15. Fig. 17 is an enlarged detail showing the connection of the connecting-rod with the shaft carrying the devices for lifting and holding down the rear ends of the sheets.

My invention relates to improvements in pneumatic machines for feeding sheets of paper to printing-presses and similar machines, and its object is to provide mechanism by which sheets of paper may be automatically fed into a printing-press or similar machine.

It has for a further object to provide improvements in pneumatic pickers by means of which the front end of a sheet of paper may be lifted by pneumatic pressure from a pile of sheets, carried forward until it engages with the tapes or other carrying devices of the printing-press or similar machine, and automatically freed and disengaged from said pneumatic pressure at the proper time.

It has for a further object to provide new and improved mechanism by which the rear end of the sheet upon the top of a pile of paper may be lifted from the sheets below, whereby the carrying forward of a single sheet by the pneumatic pickers may be insured.

It has for a further object to provide new and improved mechanism by which the rear ends of the sheets may be lifted up so as to contact with and be engaged by a pneumatically-acting roller, which engages with and lifts the rear end of a single sheet from the pile, and to insure the freeing of a single sheet from the pile.

It has for a further object to provide devices by which the rear ends of all the sheets below the one which it is designed to carry forward may be held down, so as to prevent more than one sheet at a time from being carried forward to the press by the pneumatic pickers and carriers.

It has for a further object the construction of a new and improved pneumatic automatically-acting sheet-feeder for printing and similar presses.

It has for a further object the improvements in certain details of construction hereinafter described.

I accomplish the objects of my invention as hereinafter specified and as illustrated in the drawings.

That which I regard as new will be set forth in the claims.

In the drawings, 18 indicates the framework of the feeder, upon which are mounted the devices hereinafter described.

20 indicates the driving-wheel by means of which the mechanism is operated.

21 indicates arms pivoted at their lower ends to the framework 18 and provided with rollers 22 at suitable distances above the pivots.

23 indicates cams which are keyed to the shaft 24 of the driving-wheel 20 and bear against the rollers 22 upon the arms 21, so as to move them forward as the cams 23 bear upon them.

25 indicates a connecting-rod which is pivoted at its rear end in a slot 26 at the upper end of the arm 21 and at its forward end connected with the carriage for the pneumatic sheet-pickers hereinafter described.

27 indicates a spiral spring, the forward end of which is connected with the pneumatic picker-carriage hereinafter described, and the rear end of which is fastened to the framework 18, the operation of the spring 27 being to move the carriage backward after it has been pushed forward by the operation of the cam and at the same time to throw the lever back again ready to be thrown forward by the operation of the cam 23.

28 indicates a pneumatic picker-carriage, which is provided with wheels 29, which move upon tracks 30 30, which are mounted upon the framework 18, as shown in Figs. 2, 3, 4, and 5, the detail of the carriage being best shown in Fig. 5.

31 indicates a pneumatic tube which is mounted upon the carriage 28, as best shown in Figs. 5 and 7. The tube 31 is provided with a valve-chamber 32, as best shown in said Figs. 5 and 7.

33 indicates a flexible tube of rubber or other suitable material, which is connected at its lower end with the pneumatic tube 31 and at its upper end connects with a tube 34, which is connected with a vacuum-chamber 35. The vacuum-chamber 35 is provided with a vacuum-gage 36 and has the air exhausted from it by any suitable air-pump, which, being of any approved form or type, is not shown in the drawings.

37 indicates a lever by means of which the connection of the vacuum-chamber 35 with the pneumatic devices hereinbefore and hereinafter described may be shut off or opened at will.

Referring to Figs. 5 and 7, (which are details and best show the devices,) 38 indicates a telescopic tube or picker which is mounted upon the lower end of the pneumatic tube 31. The tube 38 is mounted upon the lower end of the pneumatic tube 31, so as to slide freely, but air-tight, thereon, and has its bottom provided with a number of openings, as best shown in Fig. 7.

39 indicates a spiral spring which bears between a shoulder 40 below the carriage 28 and upon the upper end of the telescopic tube or picker 38 and tends to force the telescopic picker 38 downward.

41 indicates a guide or track which is mounted upon a cross-bar 42 secured to the framework of the machine. The guide 41 extends backward under the carriage 28, its rear end curving downward, as best shown in Fig. 5. The telescopic picker 38 is provided with a pin 43 extending horizontally outward, so as to bear upon the track or guide 41. As the carriage is moved forward by the action of the cam 23, lever 21, and connecting-rod 25 the pin 43 comes in contact with the curved-down end of the guide 41, insuring the lifting of the telescopic picker 38. As the carriage moves back after said pneumatic picker has been relieved of the sheet the spring 39 keeps the pin 43 bearing upon the upper surface of the track 41, thus dropping the picker 38 upon the sheet below it. The track is so arranged as to cause the telescopic picker 38 to drop upon the sheets below just as the carriage reaches the rearmost limit of its motion, bringing the picker over the forward edges of the sheets.

Referring to Fig. 7, 44 indicates a valve mounted in the valve-chamber 32 and adapted to open or close the pneumatic tube 31 as it is moved forward or backward. 45 indicates a rod connected with the valve 44 and extending through suitable packing a suitable distance in front of and to the rear of the valve-chamber 32. 46 indicates a cushion or buffer which is adjustably mounted upon the forward end of the valve-rod 45. 47 indicates a hinge or flap valve upon the rear of the telescopic picker 38 and connected by connecting-rods 48 49 to the rear end of the valve-rod 45. 50 indicates a lever which is pivoted at its rear end upon the side of the valve-chamber 32, its forward end being curved downward, as best shown in Fig. 5, and it is provided with a latch 51 at a suitable point between its two ends. 52 indicates a pin mounted upon the valve-rod 45, which is adapted to engage with the latch 51 of the lever 50. 53 indicates spiral springs which are connected at their forward ends with the pneumatic tube 31 and at their rear ends with the rear end of the valve-rod 45, as best shown in Fig. 6. The springs are so arranged that their tension, when left free to operate, throws the valve-rod 45 forward, opening the valve 44. 54 indicates tapes of the usual form and construction, mounted upon rollers 55 56. These tapes, being of the ordinary form and operation and forming no part of my invention, are not described more fully here. Indeed, the sheet may be taken from the picker and carried forward by any suitable mechanism.

In the above description of the pneumatic pickers and carriages I have described those upon one side of the machine, it being understood that the parts are duplicated, one upon each side of the machine, so as to engage with the sheet to be lifted upon each side. The description above given applies to both mechanisms.

The operation of the picking devices is as follows: The connection between the vacuum-chamber and the picking devices being opened by means of the lever 37, the machine is set in motion. As the carriage moves forward the buffer 46 is moved forward to its extreme limit by means of the cam 23, lever 21, and connecting-rod 25. The buffer 46 just before the carriage reaches its extreme forward limit of motion comes in contact with the cross-bar 42 and closes the valve 44. At the same time the valve 47 will be opened by the rearward motion of the valve-rod 45 communicated to it through the rods 48 49, thus allowing an ingress of air through the opening covered by the hinge or flap valve 47 into the pickers, causing the sheet which has been lifted and carried forward, as hereinafter described, to be dropped. At the same time the lever 50 drops so that the latch 51 engages with the pin 52, holding the valve closed during the return or backward motion of the carriage, as hereinafter described, until it reaches the proper point to be opened. The cam 23 being so arranged as to free the roller 22 from its pressure as the carriage 28 reaches the forward limit of its motion, the spiral spring 27 causes the carriage to move backward, moving with it the lever 21, as above described. The carriage having moved backward to such a position that the telescopic pickers 38 are above the forward end of the sheet to be lifted, the curved forward end of the lever 50 engages along its under surface with the cross-bar 42, thereby freeing the pins 52 from engagement with the latch 51, whereupon, by means of the spiral springs 53, the valve 44 is opened. At the same time, by means of the pins 43 bearing upon the track 41, the telescopic pickers 38, through the operation of the spring 39, have been lowered upon the forward surface of the paper, the devices being so regulated that the valve 44 is opened, as above described, just at the moment of contact of said pickers with the sheet below them. The vacuum thus caused in the pneumatic tubes 31 holds the sheet against the lower ends of the pickers 38 ready to be carried forward upon the next forward motion of the carriage 28. The pickers descend with just sufficient force upon the top sheet to form close connection with it, and as the air is exhausted from the pickers by means of the vacuum appliances the sheet is held firmly against the pickers, but the pickers do not hold the top sheet down upon the sheet below it so closely as to prevent all access of air beneath the top sheet. In practice it will be found that the pressure of the air below the sheet will be sufficient to at once raise the telescopic pickers 38 and with them the forward end of the sheet without the action of the pins 43 upon the guides 41, but, as above described, as the carriage moves forward the engaging of said pins 43 with the guides 41 insures the lifting of the forward end of the sheet. At the same time that the valve 44 is opened, as above described, the flap-valve 47 is closed by the forward motion of the valve-rod 45. The forward end of the sheet as the carriage is moved forward is delivered upon the tapes 54, and by them conveyed to the printing-press, ruling, or other similar machine.

57 indicates levers which are pivoted at their lower ends upon the framework 18.

58 indicates cams having cam-grooves 59, which engage with rollers 60 mounted upon the levers 57, as best shown in Fig. 4. The cams 58 are keyed upon the shaft 24 and as said shaft rotates move the levers 57 forward and backward.

61 62 indicate connecting-rods which are pivotally mounted upon the levers 57 at a suitable distance above the pivotal point of said levers and at their forward ends are connected with the ends of the pneumatic tube, hereinafter described.

63 indicates a pneumatic tube, which is provided with a number of openings 64. The pneumatic tube is mounted upon and carried by the forward ends of the connecting-rods 61 62 in such manner as to be reciprocated backward and forward as said rods are moved by the movement of the levers 57 and so as to rotate freely therein, as best shown in Fig. 12.

The pneumatic tube 63 is provided upon one end with a pinion 65, which engages with a rack 66, as best shown in Fig. 13. The rack 66 is provided with a stem 67, which passes through a pin 68 and is adjustably secured thereto by means of a set-screw 69, as best shown in Figs. 13 and 14. The pin 68 is mounted, as best shown in Fig. 14, in ears 70, which are secured to the framework of the machine. As the pneumatic tube 63 is reciprocated by the action of the connecting-rods 61 62, it will be rotated backward and forward by means of the pinion 65 engaging with the rack 66. The end of the pneumatic tube 63 opposite the end which carries the pinion 65 is rotatably mounted, as best shown in Fig. 12, in a box 71, which communicates with a vacuum-tube 72, and the vacuum-tube 63 opens into the box 71.

73 indicates flexible tubes which are connected with the vacuum-tube 72 at one end and at the other with tubes 74, which connect with the vacuum-chamber 35.

Referring to Fig. 8, which is a detail, 75 indicates a valve-chamber in which is located a valve similar to that shown in Fig. 7, but which is not shown in detail here. 76 indicates a valve-rod which projects forward for a suitable length through suitable packing in front of the valve-chamber 75. 77 indicates a U-shaped guide which is mounted upon an upright 78 secured to the framework of the machine. The valve-rod 76 passes through said upright and through the forward end of the guide 77. 79 80 indicate blocks which are adjustably secured to the valve-rod 76 within the guide 77. 81 indicates a spiral spring which is carried upon the valve-rod 76 between the forward end of the guide 77 and the block 79. 82 indicates a spiral spring which is carried upon the valve-rod 76 between the upright 78 and the block 80. 83 indicates a lever which is pivoted at its rear end upon the forward portion of the valve-chamber 75 and passes through a suitable slot in the upright 78. The lever 83 is provided with a curved bearing-shoulder 84 and with a latch 85 upon its lower side. 86 indicates a pin mounted upon the block 80 and adapted to engage with the latch 85.

The operation of this portion of my device is as follows: Assuming, for purposes of description, that the pneumatic roller is in its forward position, the machine is set in motion, as above described. By the operation of the cam-grooves 59 on the cams 58 acting upon the rollers 60 of the levers 57 the levers are moved backward, which motion is communicated, by means of the connecting-rods 61 62, to the pneumatic tube 63, the valve in the chamber 75 being closed, so as to shut off the connection between the pneumatic tube 63 and the vacuum-chamber 35. As the tube is carried backward it is rotated by the operation of the pinion 65 and rack 66, and the rotation is so timed and adjusted that as the tube reaches the back limit of its motion the openings 64 in said tube are brought opposite the paper, which is lifted up against said tube by the devices hereinafter described. At this moment the valve in the valve-chamber 75 is opened, as hereinafter described, whereby a partial vacuum is caused in the vacuum-tube 63, causing the upper sheet of the pile to be held against it by pressure of the air. The operation of the device is so timed that as soon as the sheet is engaged by means of the air-pressure, as above described, the vacuum-tube starts forward, rotating in the direction of the arrow in Fig. 10 and carrying the sheet around it. The positions of the tube at the moment that the sheets are lifted against it and at the forward limit of its motion are respectively shown in Figs. 9 and 10. As the top sheet is lifted and rolled around the pneumatic tube, as above described, the sheets below are held down by the devices hereinafter described. Just before the vacuum-tube 63 reaches the forward limit of its motion the valve in the chamber 75 is closed, as hereinafter described, allowing the sheet to be freed from the tube 63. The forward motion of the tube 63 and the mechanism which causes it are adjusted to coöperate with the action of the pneumatic pickers above described in such a way that the pneumatic tube reaches the forward limit of its motion and allows the sheet to be freed just as the pneumatic pickers above described start upon their forward motion.

The operation of the valve-closing mechanism connected with the pneumatic tube 63 is as follows: As the tube is carried forward, carrying with it the vacuum-tube 72, just before it reaches the forward limit of its motion the spiral spring 81 bears upon the forward end of the guide 77 and upon the block 79, forcing the valve-rod 76 backward and closing the valve. At the same time the lever 83 falls, allowing the latch 85 to engage with the pin 86 upon the block 80, which holds the valve in its closed position during the backward movement of the tube 63 until just before it reaches the extreme limit of its backward motion. At that time the sloping curved shoulder 84 upon the under side of the lever 83 comes in contact with the bottom of the slot in the upright 78, through which the lever 83 extends, causing the lever to be lifted and freeing it from engagement with the pin 86. In the meanwhile the spring 81 has been freed from its pressure and the spring 82 compressed, whereby, as soon as the pin 86 is released from engagement with the latch 85, the spring 82, bearing upon the forward surface of the upright 78 and upon the block 80, forces the valve-rod 76 forward and opens the valve in the chamber 75.

87 indicates a shaft which is journaled in the framework of the machine.

88 indicates cranks which are keyed upon the shaft 87 near each end, as best shown in Fig. 17, and which are provided with crank-pins 89.

90 indicates connecting-rods which are, toward their rear ends, pivotally connected with the arms 57 and at their forward ends with the crank-pins 89. The method of connecting which I prefer is shown in Fig. 17. Each of the connecting-rods 90 is provided at its forward end with a slot 91, which engages with the crank-pin 89.

92 indicates a U-shaped casting, the forward ends of which are journaled on the crank-pin 89, the rear of such casting 92 being provided with an opening through which the connecting-rod 90 passes.

93 indicates spiral springs which bear between the U-shaped castings 92 and pins 94 mounted in the connecting-rods 90, the object of this method of connection being to allow a slight amount of play between the crank and its connections in case of different heights of the pile of paper when borne upon by the holding-down devices hereinafter described.

95 indicates holders which are mounted upon the shaft 87. I prefer to make these holders hollow, as shown in Figs. 9 and 10, and of about the shape shown in Fig. 1, and perforate them along their front edges with openings, as shown in Fig. 11, in order to permit air to be blown through them for the purpose of assisting in lifting the sheet, as hereinafter described. To this end I prefer to connect them by tubes 96 (indicated in Fig. 4) to any suitable device for forcing air through them. The sheet-holders 95 are adjustably secured to the shaft 87 by means of a set-screw, as best shown in Figs. 9 and 10.

97 indicates lifters which are mounted upon the shaft 87. The manner in which these lifters are mounted is best shown in Figs. 15 and 16. Referring to these figures, 98 indicates a ring, which is adjustably secured upon the shaft 87 by means of a set-screw 99. The ring 98 is provided with a circumferential groove, within which rests an outer ring 100, the outer ring 100 being provided with a shoulder 101, within which the lifter 97 is adjustably secured by means of a set-screw 102. The lifter 97 is so constructed as to be somewhat flexible at its forward end, having stiffness enough to raise the sheets but flexibility enough to yield slightly as may be needed, as is best shown in Fig. 9. The inner ring 98 is provided with a slot 103 extending throughout a portion of its circumference, as best shown in Figs. 15 and 16, and a portion of the ring is cut away below said slot, as best shown in Fig. 16. The outer ring 100 is also provided with a slot 104, somewhat wider than and located above the slot 103 on the inner ring 98 and extending throughout a suitable portion of its circumference.

105 indicates screws having heads 106. The heads 106 are adapted to rest in the cut-away portion below the slot 103 of the inner ring 98 and to bear against the upper surface of said cut-away portion, as best shown in Fig. 16.

107 indicates tubes which are screw-threaded to engage with the screws 105 and are provided with pins 108 upon their upper ends, by means of which they may be turned. The screws 105 may be adjusted at any desired point of the slot 103 and securely fastened thereto by means of the threaded tubes 107. As the shaft 87 is rotated backward and forward it carries with it the ring 98 and the screws 105 and tubes 107. As these tubes are carried backward or forward they will bear upon the ends of the slot 104 and when so bearing cause the outer ring 100 to be rotated backward or forward, raising or lowering the lifters 97 therewith. By the adjustment of the screws 105 at proper positions in the slot 103, as above described, the lifters 97 may be given any desired amount of motion. The movement of the shaft 87, carrying the holders 95 and lifters 97, is so timed that the lifters 97 are brought upward just before the pneumatic tube 63 reaches the backward limit of its motion, the forward ends of the lifters 97 engaging with the rear ends of the pile of sheets, lifting them up in contact with the pneumatic tube 63, as shown in Fig. 9, the flexible forward ends of the lifters 97 yielding slightly to prevent a sudden or forcible contact. When the pneumatic roller 63 starts on its forward motion, the lifters 97 are lowered from engagement with the sheet, permitting all the sheets except the top one, which is engaged with the pneumatic roller, as above described, to drop upon the pile. The holders 95 are lowered at the same time and are brought to bear upon the upper surface of the pile of sheets, as shown in Fig. 10, said contact being made just as the sheet is freed from the pneumatic pressure upon the tube 63 and is engaged by the pneumatic pickers, as above described, taking the position shown in Fig. 10. At the same time a current of air blown through the holders 95 through the connections above described emerges through the holes in the front in the direction indicated by the arrow in Fig. 10 and assists in lifting the upper sheet and holding it separate from the rest of the pile of sheets.

The connection of the rod 90 with the crank-pin 89 above described prevents violent contact of the holders 95 with the sheets, thus preventing breaking of the parts.

109 indicates brackets located below and secured to the base-plate of the framework 18.

110 indicates screws which pass through the base-plate of the frame 18 and through the brackets 109.

111 indicates a table which is supported upon the upper ends of the screws 110.

112 indicates bevel-gears which rest upon the brackets 109 and are provided with screw-threaded openings through which the screws 110 pass.

113 114 indicate bevel-gears which mesh with the bevel-gears 112. The bevel-gears 113 114 are provided upon their inner sides with sprocket-wheels 115, as best shown in Fig. 4, which are connected with a sprocket-chain 116. The bevel-gears 113 114 are journaled in the framework of the machine.

117 indicates a ratchet-wheel which is keyed upon the same shaft with the bevel-gear 114 or in any suitable manner secured thereto so as to rotate therewith.

118 (see dotted lines in Fig. 2) is an eccentric mounted upon the axle 24 in the usual manner.

119 indicates a lever pivoted at its lower end to the framework 18 upon the same axial line as the ratchet-wheel 117.

120 indicates the eccentric-rod, one end of which is secured to the eccentric 118 and the other pivotally connected to the upper end of the lever 119.

121 indicates a pawl which is pivoted to the lever 119 and adapted to engage with the teeth of the ratchet-wheel 117.

122 indicates a guide which is secured to the framework of the machine, the forward end projecting upward so as to bear against the pawl 121 when said pawl is drawn backward, so as to lift said pawl and free it from the ratchet-wheel 117. As the eccentric 118 is revolved by the shaft 24 the lever 119 is moved forward and backward. In its forward motion the pawl engages with the ratchet-wheel 117, rotating it and causing the bevel-gear 114 to rotate with it. By means of the sprocket-chain 116 the motion is communicated to the bevel-gear 113, thus rotating the bevel-gears 112, the threaded openings in which, through which the screws 110 pass, being so regulated that as they are rotated, as above described, the screws 110 are lifted, raising the table 111 with them.

123 indicates a wheel which is journaled upon the forward end of a bent lever 124. The bent lever 124 is journaled upon one of the uprights of the framework 18.

125 indicates a lever which is journaled upon one of the uprights of the framework 18. The lever 125 at its forward end is pivotally connected with the rear arm of the bent lever 124.

126 indicates a connecting-rod, the upper end of which is pivotally connected with the rear end of the lever 125 and the rear end pivotally connected with the pawl 121.

127 indicates a pile of paper sheets placed upon the table 111. The wheel 123 bears upon the top of the pile of sheets of paper 127, and, with the accompanying levers above described, is so adjusted that while the pile of sheets is at the proper height to have the top one operated upon by the pneumatic pickers, as above described, the pawl by means of the levers and connecting-rod is lifted out of engagement with the ratchet-wheel 117, thus preventing its rotation and the consequent movement of the table to a greater height. As the sheets, however, are removed and the height of the pile diminishes the wheel 123 falls with them, which motion, being communicated, through the levers and connecting-rod above described, to the pawl 121, lowers it so as to engage with the teeth of the ratchet-wheel 117 as said pawl is moved forward by means of the eccentric, thus rotating the ratchet-wheel and accompanying bevel-gears and raising the screws 110 and with them the table 111. The operation of the table and accompanying devices is such as to keep the pile of sheets constantly at the proper level for the operation of the pneumatic pickers, as above described.

In order that the wheel 123 may not press upon the sheet as it is being removed by the pneumatic pickers, and thus tend to prevent it from being freely removed, the guide 122, as above described, meets the pawl 121 as it is thrown backward and lifts it, thus raising the rear end of the lever 125 by means of the connecting-rod 126 and lifting the wheel 123 from the pile of paper. This motion is timed so as to raise the wheel 123 slightly from the paper just as the pneumatic pickers engage the sheet and draw it forward, the pawl being freed from the guide 122 as said pawl is moved forward in time to permit it to engage with the ratchet-wheel 117, as above described.

In Figs. 2 and 3 the printing-press or other mechanism to which it is desired to feed the sheets is merely indicated by the dotted circles 128, which represent two rollers of such machine, between which the sheets are delivered by the tapes 54.

The object of having a series of openings in the side of the pneumatic tube 63 is to enable such an adjustment of the devices as will insure the picking up of the rear end of only one sheet at a time by said tube and to adjust such mechanism to operate upon sheets of different thickness and weight. It is obvious, of course, that the heavier the sheet the more of such holes 64 will be required to be open, the vacuum-pressure being the same. In order to adjust the device to different sheets, one or more of said holes 64 may be stopped up by pasting a small piece of paper over them, or in any other appropriate manner, until a sufficient number of said holes are left open to insure the lifting of only one sheet. The number of holes which will be left open will of course depend upon the vacuum-pressure in the vacuum-chamber, as indicated by the vacuum-gage, and upon the thickness and weight of the paper to be lifted.

In referring to the motions of the parts of the machine I have spoken of forward and backward motions.

It is to be understood that the term "forward motion" refers to motion away from the driving-wheel and toward the press and that the term "backward motion" refers to motion in the opposite direction.

That which I claim as my invention, and desire to secure by Letters Patent, is—

1. The combination with a carriage, and mechanism for reciprocating said carriage, of a telescopic pneumatic picker carried by said carriage, a valve controlling said pneumatic picker, mechanism adapted to automatically open and close said valve as said carriage is reciprocated, and guides bearing upon said pneumatic picker and adapted to raise the same as said carriage moves forward, substantially as described.

2. The combination with a carriage, supports for said carriage, and mechanism adapted to reciprocate said carriage in said supports, of a pneumatic tube carried by said carriage, a valve-chamber mounted in said tube, a valve mounted in said valve-chamber and adapted to open and close said tube, mechanism adapted to automatically open and close said valve as said carriage reciprocates, a vertically-movable picker mounted upon said tube, and guides bearing upon said vertically-movable picker and adapted to raise the same as said carriage moves forward, substantially as described.

3. The combination with a carriage, supports for said carriage, and mechanism adapted to reciprocate said carriage in said supports, of a pneumatic tube carried by said carriage, a valve-chamber mounted in said tube, a valve mounted in said valve-chamber and adapted to open and close said tube, mechanism adapted to automatically open and close said valve as said carriage reciprocates, a vertically-movable picker mounted upon said tube, guides bearing upon said vertically-movable picker and adapted to alternately raise the same and permit the same to be lowered as said carriage reciprocates, a valve mounted upon said vertically-movable picker, and mechanism connected with said valve and adapted to automatically open and close the same as said carriage reciprocates, substantially as described.

4. The combination with a carriage, guides supporting said carriage, mechanism for reciprocating said carriage in said guides, a pneumatic tube mounted on said carriage, a valve-chamber mounted in said pneumatic tube, and a valve located in said valve-chamber, of a valve-rod secured to said valve and projecting beyond said valve-chamber at both sides, a stop adapted to close said valve as said carriage reciprocates, a lever hinged to said valve-chamber and provided with a latch adapted to engage with said valve-rod and adapted to be raised out of engagement with said valve-rod as said carriage moves backward, and springs connected with said pneumatic tube and said valve-rod and adapted to open said valve when said valve-rod is disengaged from said latch, substantially as described.

5. The combination with pneumatic mechanism adapted to lift a sheet of paper at its front edge and move it forward, of a rotating reciprocating pneumatic tube provided with a series of openings upon its side, mechanism adapted to reciprocate and rotate said tube, a valve controlling the air-inlet into said tube, mechanism adapted to automatically open and close said valve as said tube reciprocates, and mechanism adapted to raise the rear end of the sheet of paper against said pneumatic tube as the same reciprocates, substantially as described.

6. The combination with a rotating reciprocating pneumatic tube provided with a series of openings upon its side, and mechanism adapted to rotate and reciprocate said tube, a vacuum-tube connected with and opening into said rotating and reciprocating pneumatic tube, a valve-chamber mounted in said vacuum-tube, a valve mounted in said chamber and controlling said vacuum-tube, of a valve-rod connected with said valve, a support for said valve-rod, a spring mounted upon said valve-rod and bearing upon said valve-rod and said support and adapted to close said valve as said pneumatic tube is moved forward, a lever hinged to said valve-chamber and provided with a latch adapted to engage with said valve-rod when said valve is closed and adapted to be lifted from said engagement when said pneumatic tube is moved backward, and a spring mounted upon said valve-rod and bearing upon it and said support and adapted to open said valve as said latch is freed from engagement with said valve-rod, substantially as described.

7. The combination with a rotating reciprocating pneumatic tube provided with a series of openings upon one side, and adapted to pneumatically engage with and lift the rear end of the top sheet of a pile of paper, and mechanism for rotating and reciprocating said tube, of a shaft, mechanism for rocking said shaft, and a series of lifting-rods adjustably mounted upon said shaft and adapted to automatically lift the rear portion of a pile of sheets against said rotating and reciprocating pneumatic tube as said tube is moved to its backward position, substantially as described.

8. The combination with a rotating reciprocating pneumatic tube provided with a series of openings upon one side, and adapted to pneumatically engage with and lift the rear end of the top sheet of a pile of paper, and mechanism for rotating and reciprocating said tube, of a shaft, mechanism for rocking said shaft, a series of lifting-rods adjustably mounted upon said shaft and adapted to automatically lift the rear portion of a pile of sheets against the rotating and reciprocating pneumatic tube as said tube is moved to its backward position, and holders mounted upon said shaft and adapted to hold down the rear end of a pile of sheets after the top sheet has been engaged with said pneumatic tube, substantially as described.

9. The combination with a rotating reciprocating pneumatic tube provided with a series of openings upon one side, and adapted to pneumatically engage with and lift the rear end of the top sheet of a pile of paper, and mechanism for rotating and reciprocating said tube, of a shaft, mechanism for rocking said shaft, a series of lifting-rods adjustably mounted upon said shaft and adapted to automatically lift the rear portion of a pile of sheets against said rotating and reciprocating pneumatic tube as said tube is moved to its backward position, hollow holders, having a series of openings in their front edges and adapted to hold down the rear end of a pile of sheets after the top sheet has been engaged with said pneumatic tube, as described, and air-tubes connected with said holders through which a stream of air may be forced through said holders under said lifted sheet, substantially as described.

10. In a pneumatic sheet-delivering device, the combination with a suction-roller, a shaft, and mechanism for rocking said shaft, of a ring adjustably secured to said shaft and provided with a circumferential groove, a ring mounted in said circumferential groove, and flexible lifters secured to said last-named ring, substantially as described.

11. In a pneumatic sheet-delivering machine, the combination of a shaft, an inner ring adjustably mounted upon said shaft and provided with a circumferential groove and having a slot in said groove extending through a portion of the ring-periphery, an outer ring mounted in said circumferential groove of the inner ring and provided with a slot throughout a portion of its circumference, screws mounted in the slot of the inner ring and adapted to engage the ends of the slot in the outer ring to impart movement to said outer ring on forward and backward rotation of the shaft and inner ring, a flexible lifting-rod mounted upon said outer ring, and a suction-roller, substantially as described.

12. The combination with mechanism adapted to engage one end of a sheet of paper and move it toward a printing-press, of a coacting, rotating, reciprocating pneumatic tube provided with one or more openings, mechanism adapted to reciprocate and rotate said tube, valve mechanism controlling the air-inlet into said tube, and adapted to automatically open and close said air-inlet as said tube reciprocates, and mechanism adapted to raise the other end of said sheet of paper against said pneumatic tube as the same reciprocates, substantially as described.

GEORGE F. LEIGER.

Witnesses:
LEWIS BENEDICT,
C. E. PICKARD.